United States Patent [19]

Poggio et al.

[11] Patent Number: 5,416,899
[45] Date of Patent: May 16, 1995

[54] MEMORY BASED METHOD AND APPARATUS FOR COMPUTER GRAPHICS

[75] Inventors: Tomaso A. Poggio, Wellesley, Mass.; Roberto Brunelli, Trento, Italy

[73] Assignees: Massachusetts Institute of Technology, Cambridge, Mass.; Instituto Trentino di Cultura, Trento, Italy

[21] Appl. No.: 819,767

[22] Filed: Jan. 13, 1992

[51] Int. Cl.⁶ ............................................. G06T 5/50
[52] U.S. Cl. ................................. 395/152; 395/138
[58] Field of Search ............... 395/152, 127, 137, 138; 345/122

[56] References Cited

U.S. PATENT DOCUMENTS

| | | | |
|---|---|---|---|
| 3,510,210 | 5/1970 | Haney | 395/152 |
| 4,600,919 | 7/1986 | Stern | 340/725 |
| 4,797,836 | 1/1989 | Witek et al. | 364/518 |
| 5,029,997 | 7/1991 | Faroudja | 352/54 |
| 5,261,041 | 11/1993 | Susman | 395/152 |

FOREIGN PATENT DOCUMENTS

WO89/09458 10/1989 WIPO .

OTHER PUBLICATIONS

Wilhelms; "Toward Automatic Motion Control", *IEEE Computer Graphics and Applications* 1987, vol. 7, No. 4, pp. 11-22.

Steketee et al, "Parametric KeyFrame Interpolation Incorporating Kinetic Adjustment and Phrasing Control", *Computer Graphics*, 1985, vol. 19, No. 3, pp. 255-262.

Sturman, "Interactive KeyFrame Animation of 3-D Articulated Models", *Proceedings of Graphics Interface '84*, 1984, pp. 35-40.

Burtnyk, Nestor et al., "Computer Assisted Film Animation," *Bulletin of the Radio and Electrical Engineering Division, National Research Council of Canada*, 20(3): pp. 8-12, (Sep. 1970).

Wein, Marceli et al., "Computer Graphics and Film Animation," *Bulletin of the Radio and Electrical Engineering Division, National Research Council of Canada*, 19(2): pp. 39-42, (Apr. 1969).

Burtnyk, Nestor et al., "Computer-Generated Key-Frame Animation," *Journal of the Society of Motion Picture and Television Engineers*, 80(3): pp. 149-153, (Mar. 1971).

Wein, Marceli et al., "A Computer Facility for Film Animation and Music," *Canadian Computer Conference Session*, pp. 2122-2125, (Jun. 1971).

Burtnyk, Nestor et al., "Towards a Computer Animating Production Tool," *Eur Comput Congr Proc*, pp. 171-185, (May 13-17, 1974).

(List continued on next page.)

*Primary Examiner*—Heather R. Herndon
*Assistant Examiner*—Joe Feild
*Attorney, Agent, or Firm*—Hamilton, Brook, Smith & Reynolds

[57] ABSTRACT

A memory based computer graphic animation system generates desired images and image sequences from 2-D views. The 2-D views provide sparse data from which intermediate views are generated based on a generalization and interpolation technique of the invention. This technique is called a Hyper Basis function network and provides a smooth mapping between the given set of 2-D views and a resulting image sequence for animating a subject in a desired movement. A multilayer network provides learning of such mappings and is based on Hyper Basis Functions (HBF's). A special case of the HBFs is the radial basis function technique used in a preferred embodiment. The invention generalization-/integration technique involves establishing working axes along which different views of the subject are taken. Different points along the working axes define different positions (geometrical and/or graphical) of the subject. For each of these points, control points for defining a view of the subject are either given or calculated by interpolation/generalization of the present invention.

28 Claims, 6 Drawing Sheets

OTHER PUBLICATIONS

Burtnyk, Nestor et al., "Interactive Skeleton Techniques for Enhancing Motion Dynamics in Key Frame Animation," *Communications of the ACM*, 19(10): pp. 564–569, (Oct. 1976).

Takeshi Agui et al., "Three Dimensional Computer Animation by Trigonometric Approximation to Aperiodic Motion," *Systems and Computers in Japan*, 19(5):82–88 (May 1988).

Mark C. K. Yang et al., "Automatic Curve Fitting with Quadratic B-Spline Functions and Its Applications to Computer-Assisted Animation," *Computer Vision, Graphics, and Image Processing*, 33(3):346–363 (Mar. 1986).

Henry Bortman, "The Future of Type?", *MacUser* (Jul. 1991): 187–195.

Peter Litwinowicz, "Inkwell: A $2\frac{1}{2}$-D Animation System", *Computer Graphics*, 25(4):113–121 (Jul. 1991).

Tomaso Poggio et al., "A Theory of Networks for Approximation and Learning", AI Memo No. 1140, Artificial Intelligence Laboratory, MIT, Jul. 1989, pp. 1–84.

Tomaso Poggio et al., "Regularization Algorithms for Learning that are Equivalent to Multilayer Networks", *Science*, vol. 247, Feb. 23, 1990, pp. 978–982.

Tomaso Poggio et al., "Networks for Approximation and Learning", Proceedings of the IEEE, vol. 78, No. 9, Sep. 1990, pp. 1481–1497.

Tomaso Poggio et al., "A Network that Learns to Recognize Three Dimensional Objects", *Nature*, vol. 343, No. 6255, 1990, pp. 263–266.

MEMORY BASED METHOD AND APPARATUS FOR COMPUTER GRAPHICS

RELATED PUBLICATIONS

The following references provide subject matter related to the present invention and where appropriate are herein incorporated by reference.

T. Poggio and F. Girosi, "*A Theory of Networks for Approximation and Learning*", AI Memo No. 1140, Artificial Intelligence Laboratory, Massachusetts Institute of Technology, July 1989, pages 1–84

T. Poggio and F. Girosi, "*Regularization Algorithms for Learning that are Equivalent to Multilayer Networks*", Science, Vol. 247, Feb. 23, 1990, pages 978–982

T. Poggio and F. Girosi, "*Networks for Approximation and Learning*", Proceedings of the IEEE, Vol 78, No. 9, September 1990, pages 1481–1497

T. Poggio and S. Edelman, "*A Network that Learns to Recognize Three Dimensional Objects*", Nature, Vol 343, No. 6255, 1990, pages 263–266.

BACKGROUND OF THE INVENTION

Computer technology as brought about a variety of graphics and image processing systems, from graphics animation systems to pattern recognition systems (such as neural networks). Important to such systems is the accuracy of generated (output) images and in particular image sequences.

In general, graphic animation today is typically based on the three steps of (i) three dimensional modeling of surfaces of an object of interest, (ii) physically based simulation of movements, and (iii) rendering or computer illumination of three dimensional images from calculated surfaces. The step of three dimensional modeling is typically based on a three dimensional description including x, y, z axis specifications and surface specifications. The resulting 3-D model is considered to be a physically based model. To that end, every prospective view is computable. Movement such as rotation of the whole model or portions thereof, and illumination is then accomplished through computer aided design (CAD) systems and the like. While this 3-D modeling and physical simulation approach to graphic animation is clearly fundamentally correct and potentially powerful, current results are still far from obtaining general purpose, realistic image sequences.

Before the use of three dimensional, physically based models of objects for graphics animation, two dimensional images were used. In a two dimensional image of an object only a single perspective view is provided, i.e., is computable. Basically a series of 2-D images of an object in respective poses provides the illusion of whole object or object parts movement, and hence graphic animation. This 2-D serial image approach to graphic animation is cumbersome and often requires repetition in drawing/providing portions of views from one view to succeeding views, and is thus riddled with many inefficiencies. The 3-D model based approach with computer support was developed with the advent of computer technology to improve on and preclude the inefficiencies of the 2-D image graphic animation approach.

In addition to computer systems for generating graphics animation, there are computer systems for categorizing or recognizing patterns, or more generally mapping patterns, in 3-D or 2-D views/images, occluded images and/or noisy images. These computer systems are sometimes referred to as neural networks. Typically a neural network is predefined or trained to produce a target output for a certain input. Pairs of example mappings (certain input-target output) collectively called the "training set" are presented to the neural network during the predefining stage called learning. During learning, internal parameters of the neural network are made to converge to respective values that produce the desired mappings for any subsequent given input. Thereafter, the neural network operates on subject input patterns and provides an output pattern according to the learned mapping.

SUMMARY OF THE INVENTION

The present invention provides a computer method and apparatus for generating 3-D graphics and animation based on two dimensional views and novel approximation techniques instead of 3-D physical based modeling as in prior art. In general, the present invention method uses a few views of an object, such as a person, to generate intermediate views, under the control of a set of parameters. In particular, the parameters are points along working axes and the views correspond to different points along the working axes. The working axes may be any geometrical or graphical aspect for describing a subject. To that end, the parameters define, for example, angle of rotation about a longitudinal working axis, angle of tilt about an orthogonal working axis, three dimensional position (or orientation) of the object, or the expressions of a face of the person, and the like.

The steps of the method can be summarized as
(1) providing two dimensional views of a subject;
(2) for each view, setting parameters according to geometrical and/or graphical features (such as orientation/pose and expression) of the subject and assigning control point values to the set of parameters; and
(3) generating intermediate views for desired values of the parameters by generalization/interpolation.

The set of views used during the parameter setting steps are preferably real high resolution images of the object.

In a preferred embodiment, the step of assigning control point values to the set of parameters involves a neural network learning from examples in which each of the given views serves as a training set and is associated with respective parameter values, i.e., points along the working axes, (such as the pose and expression of the person). The learning technique employed is that of the so called Hyper Basis Functions (HBF). A special case of the HBFs are the so called Radial Basis Functions in which an unknown multivariate function is approximated by the superposition of a given number of radial functions whose centers are located on the points of the training set (i.e., control points).

In accordance with one aspect of the present invention, apparatus for computer graphics animation includes a) a source for providing sample views of a subject, b) a preprocessing member coupled to the source, c) an image processor coupled to the preprocessing member, and d) display means coupled to the image processor. The source provides sample views of a subject, each sample view providing the subject in a different sample position along one or more working axes. Each working axis is formed of a plurality of points, each point having a different parameter value for defining a different position of the subject along the working axis. A sequence of the sample positions together with intermediate positions provides animation of the subject in a certain movement.

The preprocessing member is coupled to the source to receive the sample views and in turn determines values (i.e., locations) of control points in a set of control points of the subject in each sample view. For each sample view, the preprocessing member establishes an association between values of the control points and parameter values (i.e., points along the working axes) indicative of the sample position of the subject in that sample view.

The image processor is coupled to the preprocessing member and is supported by the established associations between control point values and parameter values of the sample positions of the subject. In particular, the image processor maps values of the control points for sample positions of the subject to values of the control points for desired intermediate positions (points) along the working axes to form intermediate views of the subject. The image processor forms an image sequence from both the sample views and the formed intermediate views. The image sequence defines a prototype for animation of any object in a class containing the subject.

The display means is coupled to the image processor for locally or remotely displaying the image sequence to provide graphic animation of the subject in the certain movement.

DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

FIG. 1b is a schematic illustration of intermediate views generated for the sample initial views of FIG. 1a.

FIG. 4b is a flow diagram of image preprocessing and processing subsystems of the apparatus of FIG. 4a.

DETAILED DESCRIPTION OF THE PREFERRED EMBODIMENT

Figure 1A:
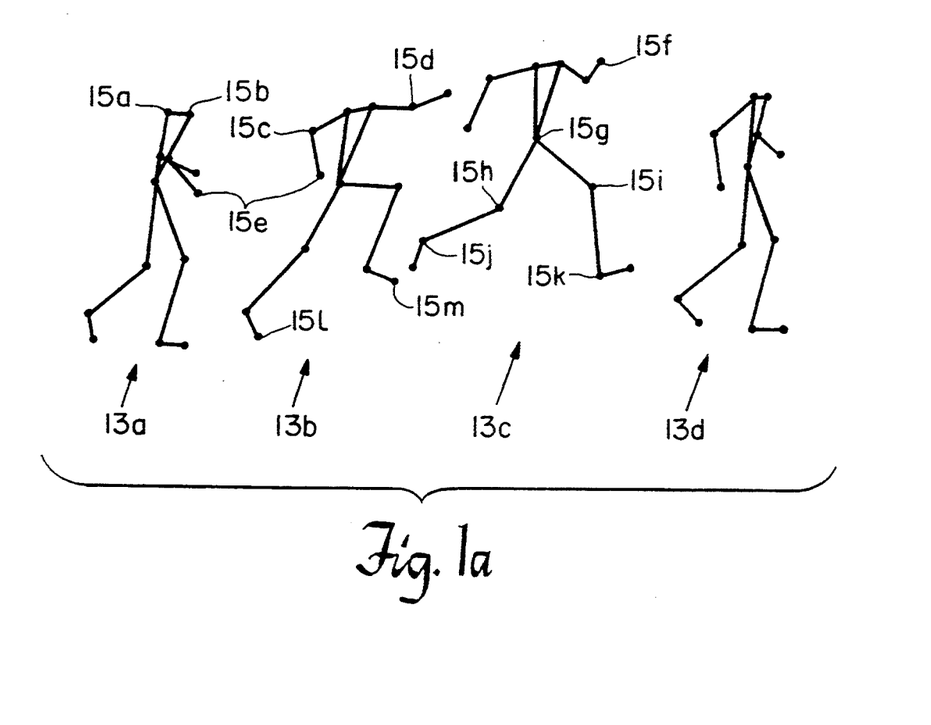
FIG. 1a is a schematic illustration of different views of a subject used in the training set of the neural network supporting the computer graphics apparatus and method of the present invention.
Figure 1B:
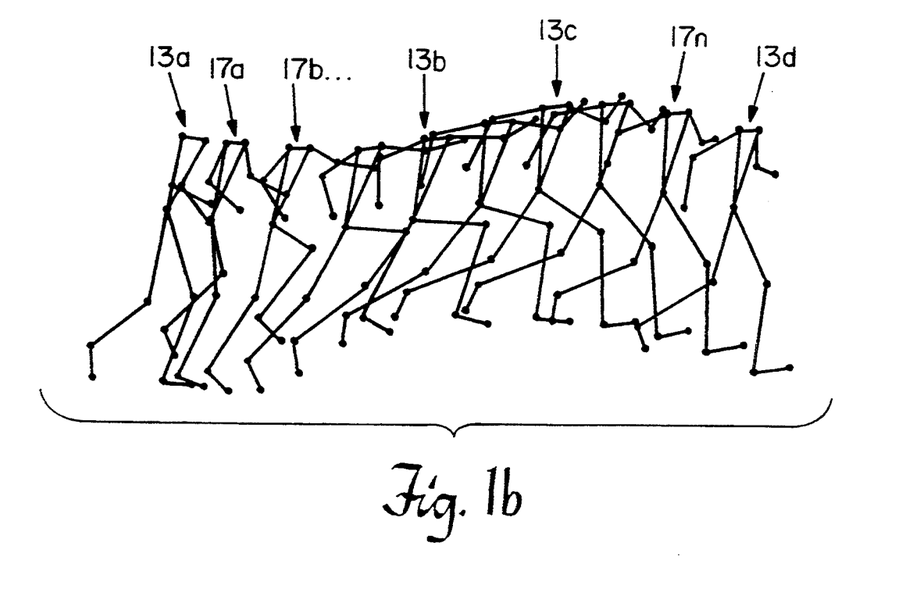

The present invention provides a memory-based apparatus and method of graphic animation. Conceptually, as illustrated in FIGS. 1a and 1b, the present invention employs a limited number of initial examples or sample views 13 of an object of interest. Each sample view 13 is an image of the subject taken at a different point along a working axis (or a different set of points along a plurality of working axes). For each sample view 13, a parameter value (or set of parameter values) represents the point (points) along the working axis (axes) from which the sample view 13 is defined, as discussed in detail later. In the illustration of FIG. 1a, each sample view 13 illustrates the object of interest at a different time t along a single axis of time and hence has an indicative parameter value (i.e., the corresponding value of t).

In addition, for each of the sample views 13 of the object, a set of two dimensional control points 15 in the plane of the view, such as characteristic features, body junctions, etc. is identified and defined. This includes establishing location values for each control point 15 in each of the sample views 13.

In turn, an input-output mapping between parameter values of the given sample views 13 of the object and the location values (for the control points 15) is established by the present invention. From this mapping, the present invention is able to generate desired intermediate views 17 (FIG. 1b) between two of the initial sample views 13 and subsequentially between newly generated intermediate views 17 and/or initial sample views 13. That is, the present invention is able to generate location values of the control points 15 for desired parameter values of intermediate positions of the subject along the working axes to form intermediate views 17. Such generation of intermediate views 17 or "in betweening" is accomplished by interpolation of values of the control points 15 from control point values associated with the parameter values initially defined for the sample views 13 to control point values for desired parameter values of intermediate views 17.

Figure 1C:
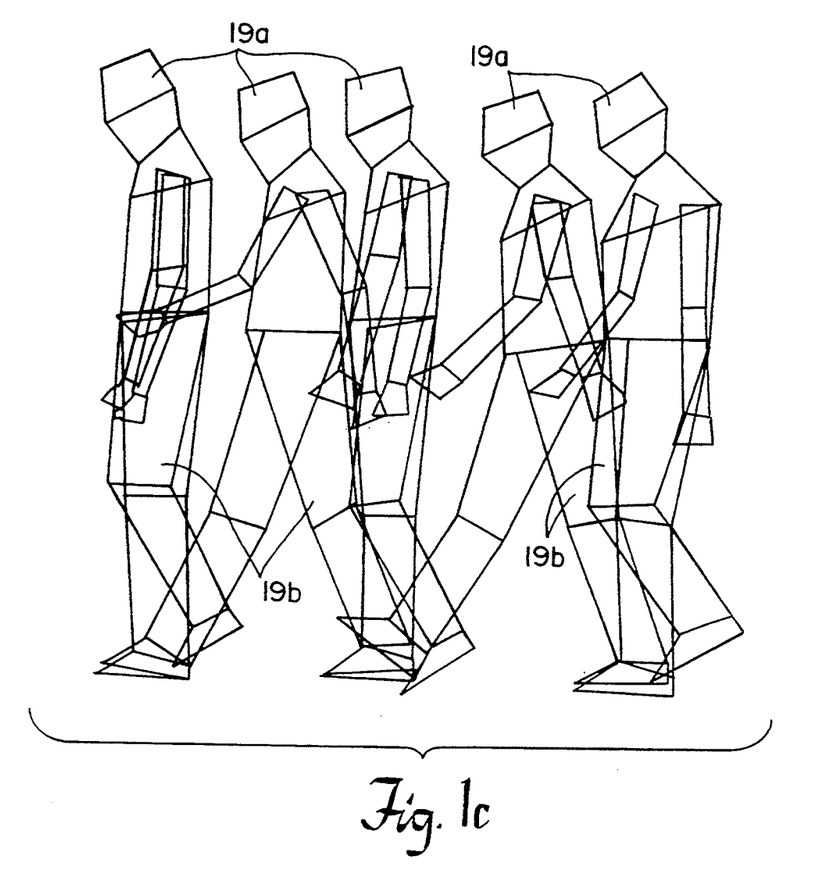
FIG. 1c is a schematic illustration of intermediate views with corresponding polygonal areas for line filling or filling by gray scaling techniques.

To give relative depth of the different control points 15, z buffering techniques, line filling or texture mapping are employed. In particular, the control points 15 in their determined (calculated) locations/location values define polygons 19 (FIG. 1c) which correspond from view to view and are able to be line filled or grey scale filled by common methods. As a result, a series of views (or images) of an object and (with proper rendering or display) animation thereof is obtained without an explicit 3-D physical based model of the object.

As mentioned, the parameter values are points along working axes, and the views are determined as being taken from a different set of points along working axes. The working axes may be any geometrical or graphical aspect for describing an object or subject. One working axes may be, for example, a longitudinal axis about which the object may be rotated. The different points along the longitudinal axis are designated in terms of angle of rotation $\theta$. For example, a given image of a head may be viewed (a) face on at $\theta = 0°$, (b) turned slightly at $\theta = 45°$, and (c) on profile at $\theta = 90°$.

Another working axis may be, for example, an orthogonal (e.g., horizontal) axis about which the object may be tilted. The different points along this axis are designated in terms of angle of tilt $\phi$. For example, the image of the head may have views at (i) $\phi = 0°$ where the head is not tilted forward or backward, (ii) $\phi = 45°$ where the head is tilted forward as in a nodding head, and (iii) $\phi = -45°$ where the head is tilted backward.

An example of a working axis defining a graphical aspect of an object is an axis of expression. Say the example head image in the foregoing discussion has a facial expression which ranges from a full smile to a straight face to a frown. The working axis in this instance is a facial expression axis formed of three points, one point with parameter value $z=1$ for indicating a full smile, one with parameter value $z=2$ for indicating a straight face, and 1 with parameter value $z=3$ for indicating a frown.

Another working axis may be time as seen in the illustration of FIGS. 1a and 1b. The points of this axis mark different instances in time, and hence the parameter values of these points indicate positions of the object at the respective instance of time.

The views of an object are then taken along a set of working axes (i.e., a single working axis or a combination of working axes throughout the views) as follows. For a moving object taken along a single axis of time, each view captures the moving object in a different position at an instance in time where $t=n$, a point along the time axis. Further, n is the parameter value corresponding to the view.

Figure 1D:
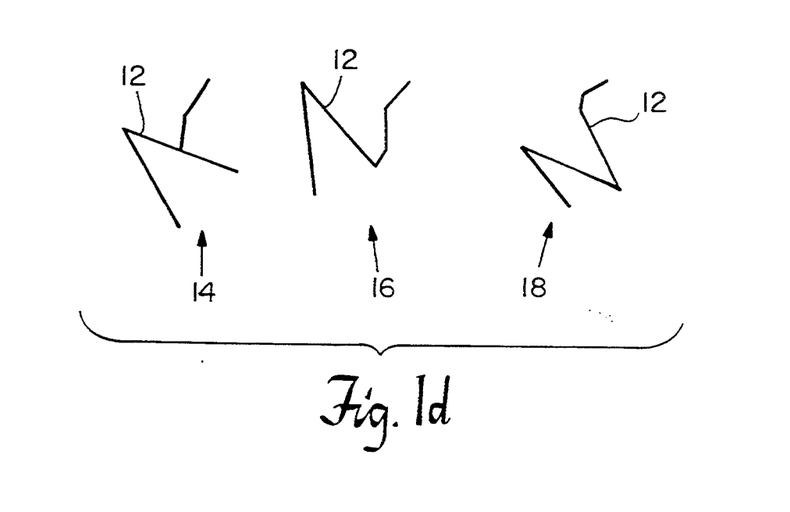
FIG. 1d is a schematic illustration of views of a subject taken along longitudinal and orthogonal working axes.

For a three dimensional object rotating about a longitudinal axis and tilting about an orthogonal (horizontal) axis, each view captures the object in a different position defined by $\vartheta$ and $\phi$ (angle of rotation and angle of tilt from above). That is, each view has a different pair ($\vartheta$, $\phi$) of parameter values indicating respective points along the longitudinal working axis and horizontal working axis. FIG. 1d is illustrative where three views of object 12 rotating and tilting about a longitudinal and horizontal working axes, respectively, are provided. The first view 14 shows the moving object 12 taken at points $\vartheta = 90°$ and $\phi = 45°$ along working longitudinal and horizontal axes, respectively. That is, object 12 is rotated 90° about a working longitudinal axis and tilted 45° about the working horizontal axis, where the second view 16 shows the moving object 12 taken at (0°, 0°), i.e., no tilt and not rotated. The third view 18 shows the moving object 12 taken at points (0°, −45°) where the object is tilted backwards.

For the image of a head turning, tilting and changing facial expressions, each view captures the head in a different position defined by $\vartheta$, $\phi$ and z as described above. That is, a view of the head face on, not tilted and with a straight expression is defined by triplet points or a treble parameter value of (0°, 0°, 2). A view of the head in profile, tilted forward 45° and with a frown is defined by treble parameter values (90°, 45°, 3) and so on.

The present invention method and apparatus is said to be memory based because a set of 2-D views is used for texture mapping instead of an explicit 3-D model which is rendered each time in prior art. It is emphasized that the set of control points 15 does not correspond to a 3-D wireframed, solid model, but rather each control point is a 2-D point in the image (view) plane. Further, the initial sample views 13 are more than two dimensional (a single perspective view) due to the definition of the control points 15 in conjunction with parameter values, but are less than a three dimensional model in which every perspective view is computable. To that end, the present invention provides a 2 ½-D memory based approach to 3-D graphics and animation. Also, it is noted that the invention provides a technique to perform "inbetweening" in a multidimensional input space (as in FIG. 1d), and not only in a one dimensional input space as in FIG. 1b.

In practice, the present invention employs two mappings, a first mapping from a set of example points (i.e., control points 15 of sample views 13) of an object to a set of desired intermediate views 17, and a second mapping from the generated intermediate views 17 to an image sequence of the object. The correspondence between control points configuration (as associated with parameter values) and desired intermediate views 17 is established from initial sample views as mentioned above. Factored into the intermediate views 17 is the space of all perspective projections of the object such that from the sample views 13 any desired intermediate views 17 of the object can be generated (i.e., calculated by interpolation). The second mapping involves texture mapping to give relative depth to the different control points. Further, where the object belongs to a class of objects, the first and second mappings are shareable amongst the other members (objects) of the class. In order to share these maps, a mapping from the control points of the instances of a desired object to those of the class prototype and its inverse is utilized.

Figure 2:
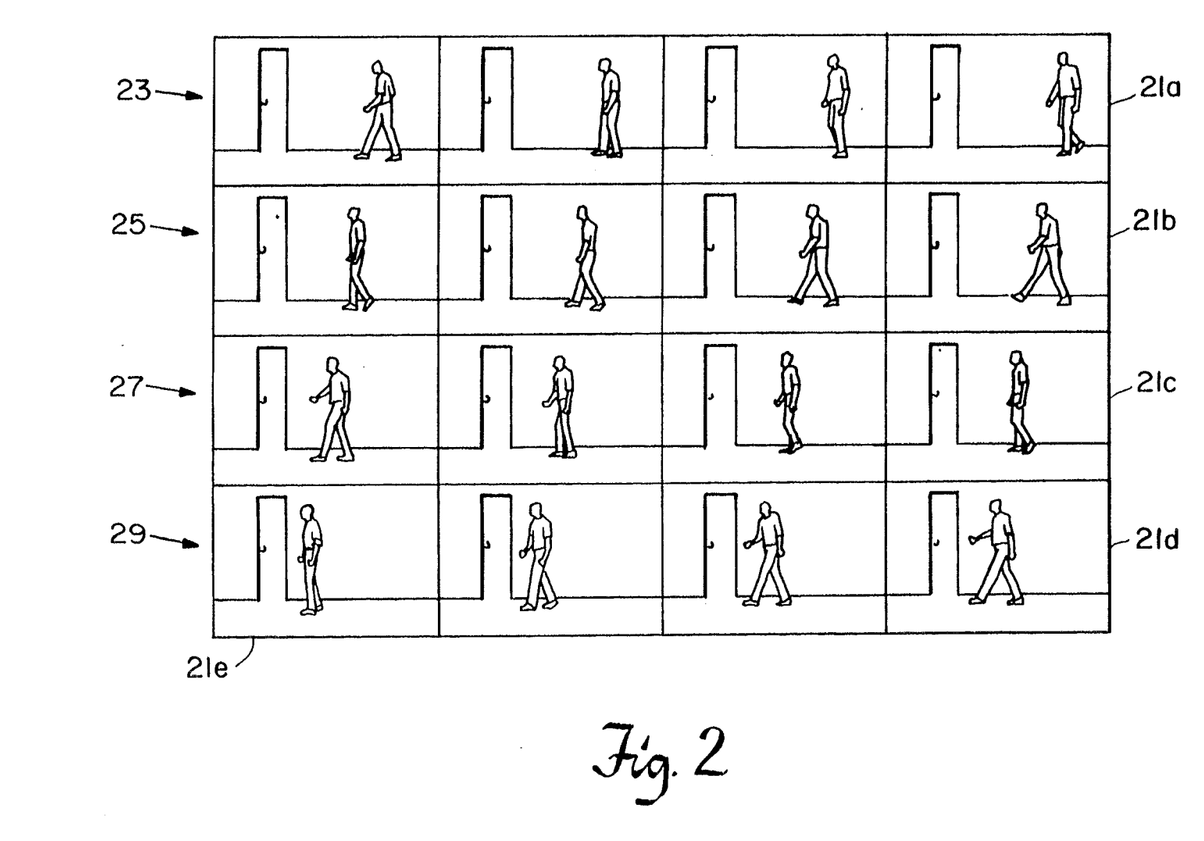
FIG. 2 illustrates a computer generated, graphics animation image sequence based on five sample (training) views in the apparatus of the present invention.
Figure 3:
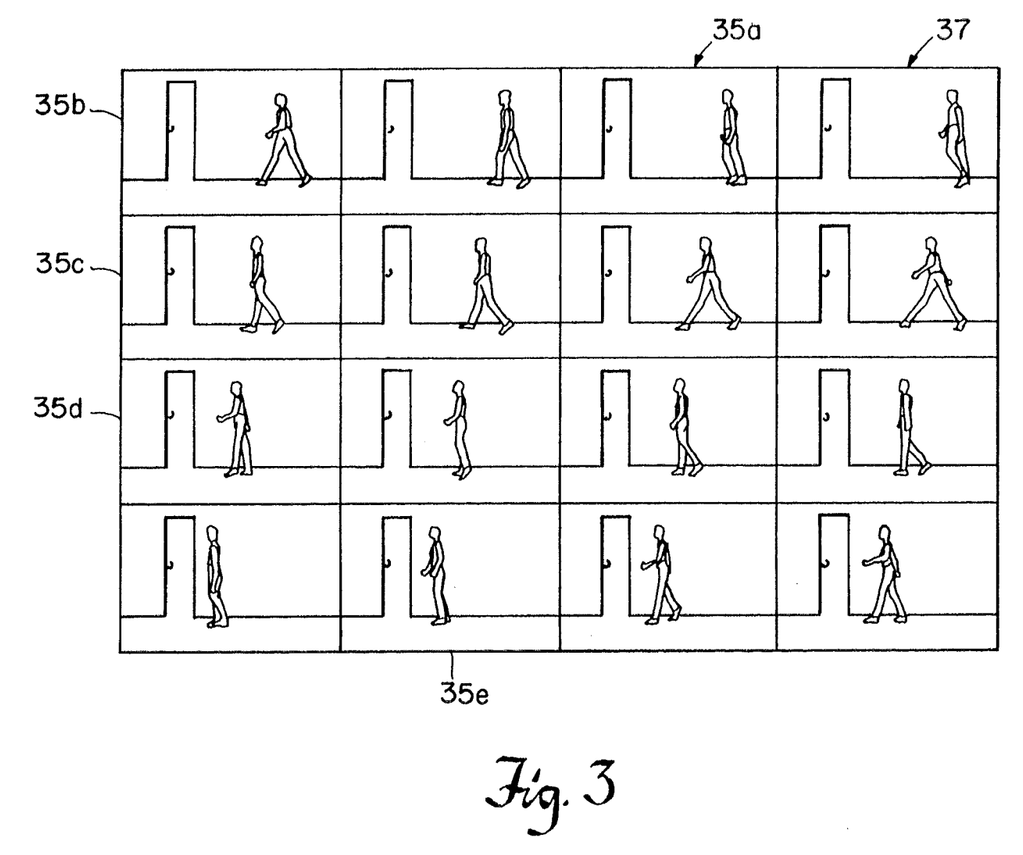
FIG. 3 illustrates graphics animation of a new subject from a common class of subjects of that of FIG. 2 using the movements (image sequences) learned for the FIG. 2 animation.

FIGS. 2 and 3 are illustrative of the foregoing practices of the present invention. The sequence of views/images of these figures is read right to left and top row down. Referring to FIG. 2, five sample views 21a, b, c, d, e are given and depict a subject ("John") in a certain movement (walking). For each view, location of each forearm, thigh, shin and foot for example is determined according to a coordinate system in the plane of the view. The coordinates for each forearm, thigh, shin and foot form a set of control point values denoted $\{C_i\} \in R^2$. For each different movement $\alpha$ (e.g., jumping, walking, running, etc.), a first map $M_\alpha$ associates control point values $C_i$ with specific respective parameter values (i.e., points along the working axes).

From each set $\{C_i\}$ of control point values the absolute coordinates of the control points is transformed to barycentric coordinates by common methods and means. The resulting control points in barycentric coordinates forms a new set $\{C_i^B\}$ of control point values. It is this new set of control point values which is used in the first mapping from sample views 21 to desired intermediate views. Barycentric coordinates are used because this mapping is intrinsic to the subject, while movement of the subject is relative to the environment.

In particular, the subject S is composed of a given number of polygonal elements $U_i$, each element $U_i$ being defined by a subset of the set of control points $\{C_i^B\}$. For example a triangle element $U_i$ is formed by control points 15a, b, and g in the subject of FIG. 1a, and other elements $U_i$ are rectangles, ellipses and the like in the subject S of FIG. 2. Subject S is then mathematically denoted $$S = \{U_i\}.$$

Animation of the subject S, using a particular movement map $M_\alpha$ along a working axis of time, for example, amounts to introducing a temporal dependence denoted $$S(t) = \{U_i(t)\}.$$

Each element $U_i(t)$ is computed using the map $M_\alpha$ for the given movement. That is, each single control point value $C_i$ of element $U_i$ is mapped by the function $M_\alpha$ resulting in the transformed $U_i$, and the same is done for each $U_i$ (and its control point values $C_i$) of subject S. An intermediate view results. Further intermediate views are similarly generated using the foregoing transformation of each element $U_i$ of subject S according to the function of the desired map $M_\alpha$. It is from these intermediate views that an image sequence for a graphic animation of the subject is generated from sample views 21.

Having generated intermediate views from sample views 21, a texture mapping is next employed to create images from the intermediate views, and in particular an image sequence for the graphic animation of the subject "John" of sample views 21. Texture mapping is accomplished by standard techniques known in the art. In particular, texture mapping maps grey values for each of the polygons defined between control points of a sample view to the corresponding polygons in the generated intermediate views.

In a preferred embodiment, apparatus of the present invention implements the function.

$$f^*(x) = \sum_{\alpha=1}^{n} c_\alpha G(\|x - t_\alpha\|_w^2) + p(x) \qquad \text{Equation 1}$$

where
- $G(x)$ is a radial Gaussian function (such as the radial Green's function defined in "*Networks for Approximation and Learning*" by T. Poggio and F. Girosi, IEEE Proceedings, Vol. 78, No. 9 September 1990), thus, $G(x)$ is a Gaussian distribution of the square of the distance between desired x and predetermined $t_\alpha$.
- x is the position or points along working axes (parameter values) for which control point location values are desired;
- $c_\alpha$ are coefficients (weights) that are "learned" from the known/given control point values of sample views 21. There are in general much fewer of these coefficients than the number N of sample views ($n \leq N$).
- $t_\alpha$ is a so called "center" of the Gaussian distribution and is on a distinct set of control points with known parameter values from given sample views 21; and
- p(x) is a polynomial that depends on chosen smoothness assumptions. In many cases it is convenient to include up to the constant and linear terms.

Further function G may be the multiquadric $G(r) = \sqrt{c + r^2}$ or the "thin plate spline" $G(r) = r^2 \ln r$, or other specific functions, radial or not. The norm is a weighted norm $$\|x - t_\alpha\|_w^2 = (x - t_\alpha)^T W^T W (x - t_\alpha) \qquad \text{Equation 2}$$

where W is an unknown square matrix and the superscript T indicates the transpose. In the simple case of diagonal W the diagonal elements $w_i$ assign a specific weight to each input coordinate, determining in fact the units of measure and the importance of each feature (the matrix W is especially important in cases in which the input features are of a different type and their relative importance is unknown).

From the foregoing Equations, location values for control points in intermediate views at times t in the example of FIG. 2 (or more generally at desired points/parameter values along working axes) are approximated (interpolated), and in turn sample view elements $U_i$ are mapped to the transformed instance $U_i(t)$ of that element. As a result, intermediate views for a first image sequence part 23 (FIG. 2) between sample views 21a and 21b are generated for a first range of t. Intermediate views for a second image sequence part 25 between sample views 21b and 21c are generated for an immediately succeeding range of t. Intermediate views for a third image sequence part 27 between sample views 21c and 21d are generated for a further succeeding range of t. And intermediate views for a fourth image sequence part 29 between sample views 21d and 21e are generated for an ending range of t.

Effectively a smooth image sequence of John walking is generated as illustrated in FIG. 2. Smooth image sequences for other movements of John are understood to be similarly generated from the foregoing discussion. In a like manner, smooth image sequences for different poses (defined by rotation about a longitudinal axis and/or tilt about an orthogonal axis, and the like) and/or different facial expressions are understood to be similarly generated.

Figure 5:
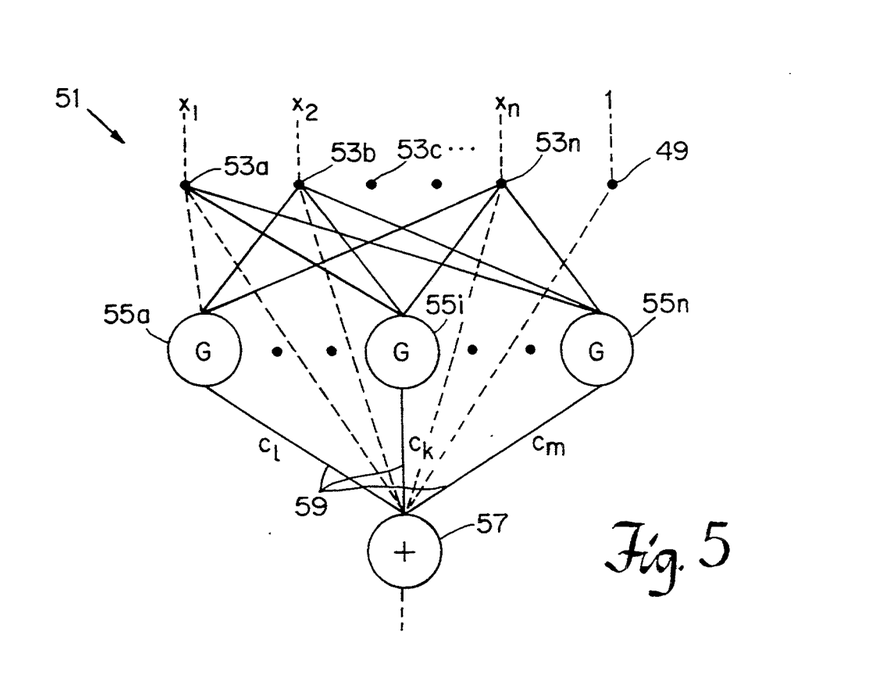
FIG. 5 is a schematic illustration of a neural network employed by the computer graphics apparatus of the present invention in FIGS. 4a and b.

Implementation of the foregoing and in particular implementation of Equation 1 is accomplished in a preferred embodiment by the network 51 illustrated in FIG. 5. Neural network or more specifically the Hyper Basis Function network 51 is formed of a layer of input nodes 53, coupled to a layer of working nodes 55 which send activation signals to a summing output node 57. The input nodes 53 transmit signals indicative of an input pattern. These signals are based on the control points $C_i$, corresponding parameter values defining the view of the subject in the input pattern, and desired movement $\alpha$. Each input node 53 is coupled to each working node 55, that is, the layer of input nodes 53 is said to be fully connected to working nodes 55 to distribute the input pattern amongst the working node layer.

Working nodes 55 are activated according to Equation 1 (discussed above) in two different modes, initially in a learning mode and thereafter in operation mode for mapping desired patterns. During learning mode, the sample views of a subject of interest (e.g., the five sample views 21 of "John" in FIG. 2) serves as a training set of input patterns. More accurately, the control points of the sample views and their corresponding parameter values along a working axis (or axes) for the given movement $\alpha$ provides an input-output mapping $M_\alpha$ to working nodes 55. Internal weights and network coefficients ($c_\alpha$, $w_i$ or W, $t_\alpha$) are adjusted for each input-output mapping of the sample views and consequently are made to converge at respective values.

In the preferred embodiment this includes finding the optimal values of the various sets of coefficients/weights $c_\alpha$, $w_i$ and $t_\alpha$, that minimize an error functional on the sample views. The error functional is defined $$H[f^*] = H_{c,t,W} = \sum_{i=1}^{N} (\Delta_i)^2, \qquad \text{Equation 3}$$

with $$\Delta_i \equiv y_i - f^*(x) = y_i - \sum_{\alpha=1}^{n} c_\alpha G(\|x_i - t_\alpha\|_w^2).$$

a common/standard method for minimizing the error function is the steepest descent approach which requires calculations of derivatives. In this method the values of $c_\alpha$, $t_\alpha$ and W that minimize $H[f^*]$ are regarded as the coordinates of the stable fixed point of the following dynamical system:

$$c_\alpha = -\frac{\omega \partial H[f^*]}{\partial c_\alpha} \quad \alpha = 1, \ldots, n \quad \text{Equation 4}$$

$$t = -\frac{\omega \partial H[f^*]}{\partial t_\alpha} \quad \alpha = 1, \ldots, n \quad \text{Equation 5}$$

$$W = -\frac{\omega \partial H[f^*]}{\partial W} \quad \text{Equation 6}$$

where $\omega$ is a system parameter.

A simpler method that does not require calculation of derivatives is to look for random changes in the coefficient values that reduce the error. Restated, random changes in the coefficients/weight $c_\alpha$, $t_\alpha$, and W are made and accepted if $H[f^*]$ decreases. Occasionally changes that increase $H[f^*]$ may also be accepted.

Upon the internal weights and network coefficients taking on (i.e., being assigned) these values, the neural network 51 is said to have learned the mapping for movement $\alpha$ (denoted $M_\alpha$ above). Movement $\alpha$ may be an element of the set consisting of walking, running, jumping etc., with parameter values along a single working axis of time. Movement $\alpha$ may be an element in a set of poses (orientation by angles of rotation and tilt) with parameter value pairs along two working axes. Movement $\alpha$ may be an element in a set of poses and expressions with parameter values in triplets along three working axes (a longitudinal, horizontal and expression axes). And so on, commensurate with the previous discussion of working axes. The same learning procedure is employed for each given movement $\alpha$ with sample views for the same. Thus, at the end of learning mode, the neural network 51 is trained to map a set of parameter values along pertinent working axes into 2-dimensional views of the subject of interest.

After completion of the learning mode, and hence establishment of internal weights and network coefficients W, $c_\alpha$, $t_\alpha$, the working nodes 55 are activated in operation mode. Specifically, after learning, the centers $t_\alpha$ of the basis functions of Equation 1 above are similar to prototypes, since they are points in the multidimensional input space. In response to the input signals (parameter values coordinates of desired position or view of a subject along working axes) from input nodes 53, each working node 55 computes a weighted distance of the inputs from its center $t_\alpha$, that is a measure of their similarity, and applies to it the radial function G (Equation 1). In the case of the Gaussian G, a working node has maximum activation when the input exactly matches its center $t_\alpha$. Thus, the working nodes 55 become activated according to the learned mappings $M_\alpha$.

Working nodes 55 transmit generated activation signals G along lines 59 to summing output node 57. Each transmission line 59 multiplies the respective carried activation signal by a weight value $c_\alpha$ determined during the learning mode of the network. Thus output node 57 receives signals cG from each working node 55 which represents the linear superposition of the activations of all the basis functions in the network 51. Output node 57 adds to the CG signals direct, weighted connections from the inputs (the linear terms of p(x) of Equation 1 shown by dotted lines in FIG. 5) and from a constant input node 49 (a constant term). The total provides an output in accordance with Equation 1.

This output is interpreted as the corresponding map for the given input (desired) parameter values. That is, the output defines the coordinates (location values) of the control points for intermediate views, and ultimately defines the image sequence for the initial sample views.

It is noted that in the limit case of the basis functions approximating delta functions, the system 51 of FIG. 5 becomes equivalent to a look-up table. During learning, the weights c are found by minimizing a measure of the error between the network's prediction and each of the sample views. At the same time the centers $t_\alpha$ of the radial functions and the weights in the norm are also updated during learning. Moving the centers $t_\alpha$ is equivalent to modifying the corresponding prototypes and corresponds to task dependent clustering. Finding the optimal weights W for the norm is equivalent to transforming appropriately, for instance scaling, the input coordinates correspond to task-dependent dimensionality reduction.

Software/Hardware Support

Figure 4A:
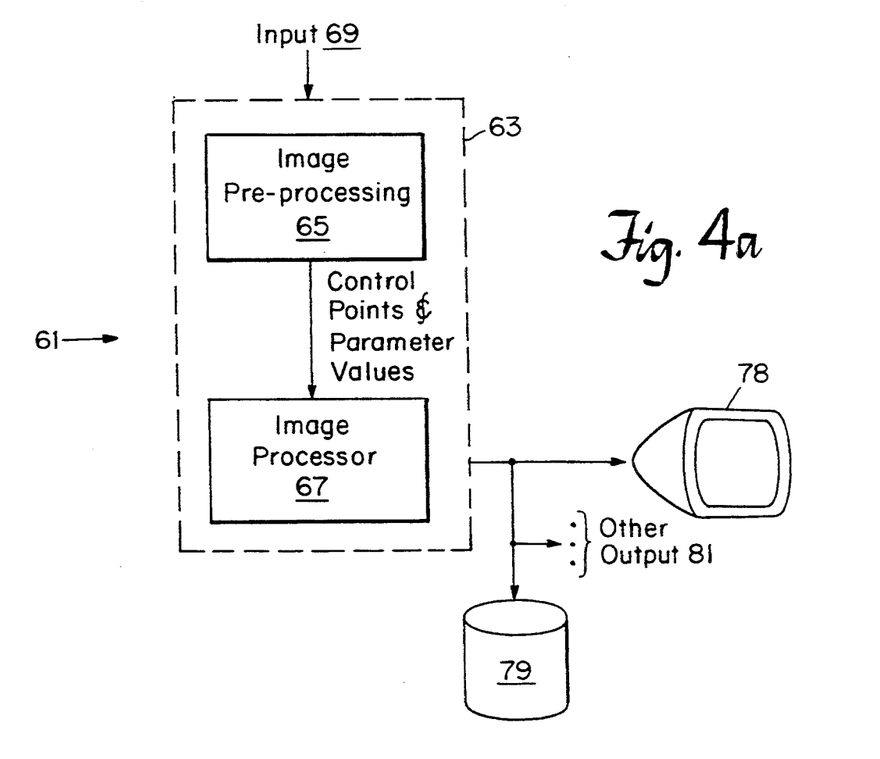
FIG. 4a is a block diagram of computer graphics apparatus of the present invention.
Figure 4B:
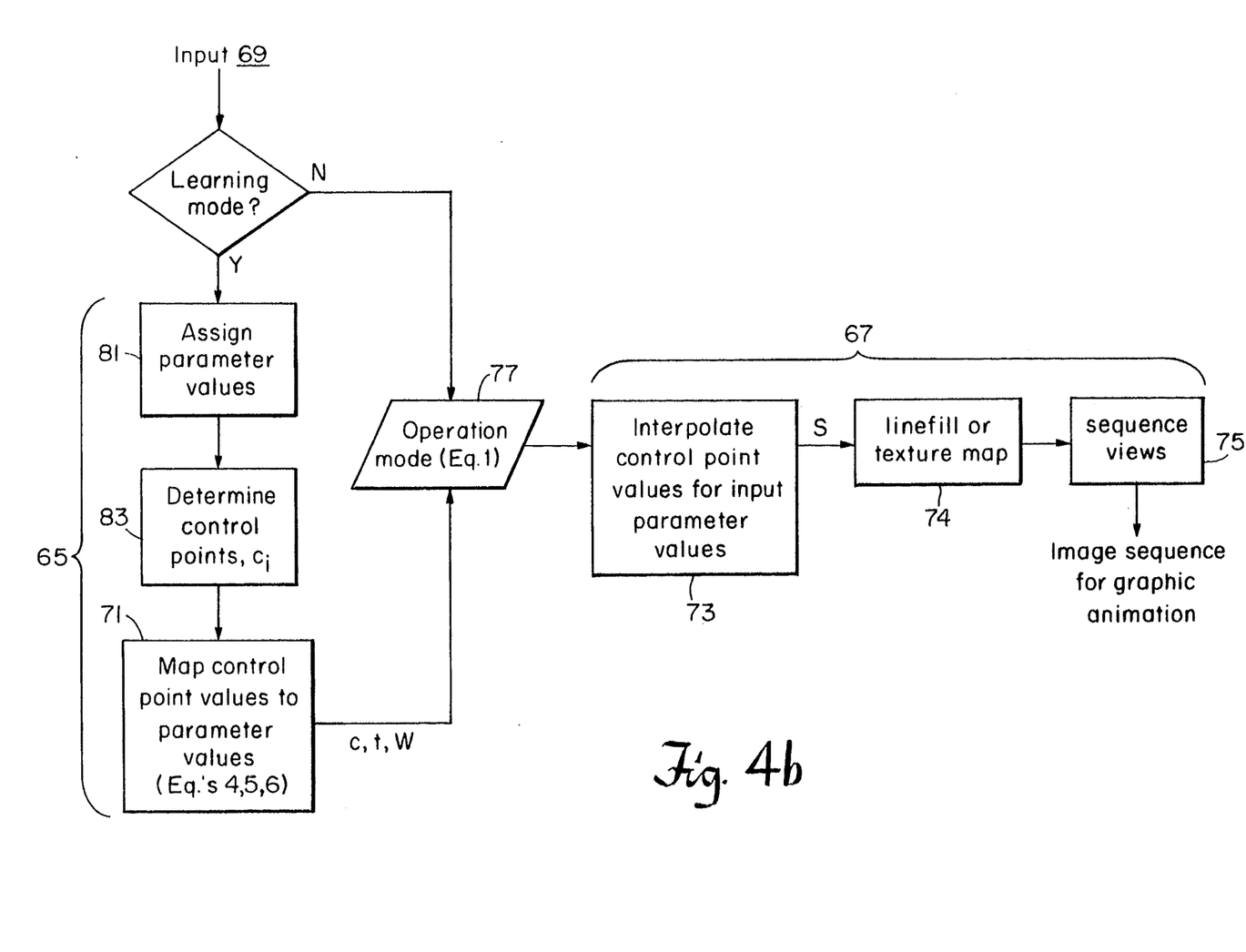

The pattern mapping system 51 of FIG. 5 is generally embodied in a computer system 61 illustrated in FIGS. 4a and 4b. Referring to FIG. 4a, a digital processor 63 of the computer system 61 receives input 69 from internal memory, I/O devices (e.g., a keyboard, mouse and the like) and/or memory storage devices (e.g., importable memory files, disk storage, and the like). In the case where the input is sample views or input patterns the digital processor 63 employs an image preprocessing member 65 for determining a set of control points $C_i$ and corresponding values for each control point throughout the different input patterns 69. The preprocessing member 65 also determines for each input pattern, the corresponding parameter values for a desired movement $\alpha$ of a subject in the input pattern 69. The image preprocessing member 65 is implemented in hardware, software or a combination thereof as made clear later. One implementation is neural network 51 in its learning mode as illustrated in FIG. 5. A more general software implementation is outlined in the flow diagram of FIG. 4b.

Referring to the left side portion of FIG. 4b, when input 69 is sample views or input patterns 69, image preprocessor 65 implements a learning mode. Given (from the user or other sources) at the start of the learning mode is a definition of the working axes. At 81, in FIG. 4b, image preprocessor 65 establishes parameter values (points) along the working axes and assigns a different parameter value (single, pair or triplet, etc.) to each input pattern (sample view) 69. Next at 83, image preprocessor 65 extracts a set of control points $C_i$ for application to each input pattern 69, and for each input pattern determines control point values.

At 71, image preprocessor 65 establishes an association or mapping $M_\alpha$ between values of the control points and parameter values of the working axes. In effect, this is accomplished by image preprocessor 65 calculating Equations 4, 5 and 6 (discussed above) to determine the coefficients for Equation 1 (the supporting equation of network 51 in FIG. 5). From 71, coefficients $c_\alpha$, $t_\alpha$ and W result, and in turn defines the Hyper Basis function network 51 operation mode, which implements Equation 1 as discussed in FIG. 5. Another implementation of the function (Equation 1) supporting operation mode is image processor 67 outlined in flow diagram fashion in the right side portion of FIG. 4b and discussed next. It is understood that other implementations are suitable.

When input 69 is an indication of user desired views at input parameter values along the working axes, the input 69 is transferred to operation mode module 77.

Under operation mode module 77, for each desired position (input parameter values) of the subject in the desired movement $\alpha$ (along the working axes), image processor 67 (i) applies mapping $M_\alpha$ to the input parameter values and (ii) determines the corresponding control point values. This is accomplished by interpolation (using Equation 1) as indicated at 73 in FIG. 4b. Image processor 67 uses the resulting values of control points $C_i$ to define polygonal elements $U_i$, and in turn forms subject S in the desired position along working axes. At 74 image processor 67 applies line filling or texture mapping to form an intermediate view of the resulting subject S. Image processor 67 next places in the formed view in sequence 75 with other views (i.e., desired positions of the subject) generated for the desired movement $\alpha$ of the subject S.

The computer system 61 of FIGS. 4a and 4b can also generate isolated views, if so desired, corresponding to input parameter values (position of the subject along working axes) that do not correspond to any of the example views used in training. The computer system 61 can also generate views of another subject in the same class of the subject for which a sequence of views has been generated for a desired movement, as discussed next.

Where the input 69 is a view of a subject belonging to a class of subjects for which an image sequence has already been formed, a map from the control points of the subject of the current input 69 to that of the prototype of the class is performed at 73 as follows. Referring back to FIG. 2 in the case where subject John is a member of a class of objects, the generated image sequence of John may be utilized to similarly animate another object of that class. In order to animate another object of the same class, the present invention transforms the established desired movement of the class prototype. For example, assume that it is desired to generate images of a different person, say Jane walking, and the FIG. 2 generated views of John walking is a prototype of the class common to John and Jane. Of course the FIG. 2 procedure may be repeated for initial sample views 35a, b, c, d, e of Jane in FIG. 3, but shortcuts are herein provided. That is, the present invention exploits the image sequence generated for prototype John to animate other objects of the same class (namely Jane) with minimal additional information.

One of the simplest ways of mapping Jane onto the available class prototype (John) is that of parallel deformation. The first step consists in transforming the control points of the reference frame of the prototype and of the new subject to their barycentric coordinates. This operation allows separation of the motion of the barycenter, which is considered to be intrinsic to the learned movement, from the motion around it, which depends on the particular instance mapped. The set of the control points is then embedded in a 2n-dimensional space.

A parallel deformation is defined by:

$$S_B(t) = R_B(-1) + [S_B(0) - R_B(0)] \qquad \text{Equation 3}$$

where R is the reference characteristic view of John (in this example;
the subscript B means that the control points are considered in their barycentric coordinates; and
R is the prototype and S is the new subject.
The subjects are considered embedded in a 2n-dimensional space (n being the number of control points). From t, we can obtain the image of Jane at time t, obtaining first the set of control points at time t by transforming the image of John at time t by the displacement $[S_B(0) - R_B(0)]$. This generates an image of Jane in the position (i.e., pose) for each view of prototype John in FIG. 2. Thus, there exists a one-to-one correspondence or mapping between the views of Jane in FIG. 3 and the views of prototype John in FIG. 2. The image sequence, and hence animation, of Jane walking illustrated in FIG. 3 results from just one sample view (e.g., first view 37) of Jane. Image sequences of other movements of Jane are similarly transposed/mapped from the image sequences of the same movements defined for class prototype John.

To that end, transposition by parallel deformation maps control point values at parameter values of a prototype subject to that of a new subject for a common pose. Thus, although a given first view 37 (FIG. 3) of a new subject is not necessarily a view of the new subject in the same pose as that of the class prototype in the sample views 21 used to establish the image sequence of the class prototype, the present invention generates an image sequence of the new subject in a desired movement $\alpha$ from the image sequence of the class prototype in the same movement. The one given first view 37 (FIG. 3) of the new subject only affects this mapping by initially establishing control points of the new subject.

The reason this type of mapping is called parallel deformation is the following. If we look at the 2n-dimensional vectors, we see that views of Jane are obtained adding to the corresponding frame (view) of the prototype at time t the difference between the prototype at $t=0$ and the given first view of Jane $t=0$. This provides that the deformations (i.e., the difference between the subjects at time t and its characteristic view) of the prototype and of Jane are then parallel by construction.

Accordingly, a series of working or intermediate views of the subject in the current input 69 are generated from the sample and intermediate views of the image sequence for the class prototype.

At any rate the output in FIG. 4b of image processor 67 is an image sequence of subject S in a desired movement $\alpha$. Referring back to FIG. 4a, digital processor 63 displays this image sequence through a display unit 78 to provide graphical animation of the subject S. Alternatively, digital processor 63 stores the image sequence in a memory storage device/area for later display. Other I/O devices to which the image sequence is output includes, without limitation, printers, facsimile machines, communication lines to remote computer workstations, and the like illustrated at 81 in FIG. 4a.

One software embodiment of the image preprocessing member 65 and image processor 67 is the C program called "Shaker" found in the software library of the Istituto per la Ricerca Scientifica e Technologicá, Trento, Italy and Massachusetts Institute of Technology Artificial Intelligence Laboratory, Cambridge, Mass., U.S.A.

As can be seen from the foregoing description of computer system 61 employing computer graphics animation apparatus and method of the present invention, the present invention has applications in animation of cartoon characters, video conferencing and other image processing applications. As for animation of cartoon characters any desired view of a cartoon character may be generated from a "training set") consisting of a large set of available views of the cartoon character.

The video conferencing application or more generally teleconferencing is implemented with two or more computer systems or workstations 61 transmitting parameter values and control point values across communications lines 81 coupling the systems and generating image sequences therefrom. Respective display units 78 at each workstation provides display of generated image sequences. And transmission of text files or audio signals provide communications between users of sending and receiving systems 61. The present invention ability to animate an image using parameter values along working axes and a limited number of control points reduces drastically the amount of information that needs to be transmitted, and thus enables such teleconferencing.

Other applications are understood to be within the purview of those skilled in the art.

Equivalents

While the invention has been particularly shown and described with reference to a preferred embodiment thereof, it will be understood by those skilled in the art that various changes in form and details may be made therein without departing from the spirit and scope of the invention as defined by the appended claims. For example, other multivariate approximation and interpolation techniques may be used in place of the Hyper Basis Functions employed in the disclosed preferred embodiment. Such techniques are either a special case of Hyper Basis Functions (such as generalized splines, tensor product spline, and tensor product linear interpolation), or similar to Hyper Basis Functions (such as Multi Layer Perceptrons and Kernel techniques).

We claim:

1. Apparatus for computer graphics and animation comprising:
   a source for inputting sample views of a subject belonging to a class of similar objects, each sample view providing the subject in a different sample position along at least one working axis, each working axis being formed of a plurality of parameter values, each parameter value of a working axis defining a different position of the subject along that working axis;
   a preprocessor coupled to receive from the source the sample views, the preprocessor determining (i) a set of control points of the subject in each sample view, and (ii) plane coordinate values of the control points in each sample view, and for each sample view, the preprocessor associating the coordinate values of the control points with the parameter values of each working axis indicative of the sample position of the subject in that sample view, for different objects of the class, the preprocessor determining different sets of control points;
   an image processor coupled to the preprocessor and responsive to the associations between the coordinate values of the control points and the parameter values of the sample positions of the subject, the image processor mapping the coordinate values of the control points for sample positions of the subject to control point coordinate values for desired intermediate positions along each working axis to form intermediate views of the subject, the image processor forming a set of image sequences from both the sample views and formed intermediate views, one image sequence for each working axis, the set of image sequences defining a range of subject positions for animation, in a certain movement, of any object in the class of objects; and
   a display coupled to the image processor for displaying an image sequence from the set of image sequences to provide graphic animation of the subject in the certain movement.

2. Apparatus as claimed in claim 1 wherein the image processor includes means for forming an image sequence from the sample views and intermediate views arranged in order according to sequence of the sample and intermediate positions for animating the subject in the certain movement.

3. Apparatus as claimed in claim 1 wherein:
   the source further inputs at least one example view of an object of the class other than the subject; and
   the image processor includes means for mapping the coordinate values of the control points of the views forming the set of image sequences to control points of the example view to determine, for each parameter value of each working axis, coordinate values of the control points for intermediate views of the object, to generate a respective image sequence for animating the object in the certain movement.

4. Apparatus as claimed in claim 1 wherein the display includes a display unit networked to the image processor for remote display of the image sequences.

5. Apparatus as claimed in claim 1 wherein the source includes means for establishing at least one working axis that defines the position of the subject as one of rotation about a longitudinal axis, tilt about an orthogonal axis, instance in time along a time axis, or facial expression along a respective axis.

6. The apparatus as claimed in claim 1 wherein the display further displays an image from the set of image sequences to provide graphic representation of the subject.

7. In a computer system, a graphics and animation method, comprising the steps of:
   inputting sample views of a subject belonging to a class of similar objects, each sample view providing the subject in a different sample position along at least one working axis, each working axis being formed of a plurality of parameter values, each parameter value of a working axis defining a different position of the subject along that working axis, and a sequence of the sample positions together with intermediate positions animating the subject in a certain movement;
   determining a set of control points of the subject in each sample view, including for different objects of the class of similar objects, determining different sets of control points;
   for each sample view (i) determining plane coordinate values of the control points, and (ii) establishing an association between the coordinate values of the control points and parameter values of each working axis indicative of the sample position of the subject in that sample view;
   mapping the coordinate values of the control points for sample positions of the subject to the coordinate values of the control points for desired intermediate positions along each working axis to form intermediate views of the subject;
   forming a set of image sequences from both the sample views and formed intermediate views, one image sequence for each working axis, the set of image sequences defining a range of subject positions for animation of any object in the class of objects; and displaying an image sequence from the set of image sequences through a display of the computer system to provide graphic animation of the subject in the certain movement.

8. A method as claimed in claim 7 wherein the step of mapping control point values for sample positions of the subject to control point coordinate values for desired intermediate positions includes interpolating values of the control points between parameter values of the sample positions and desired parameter values of the intermediate positions.

9. A method as claimed in claim 7 wherein the step of forming a set of image sequences includes arranging the sample views and formed intermediate views in order according to sequence of the sample and intermediate positions for animating the subject in the certain movement.

10. A method as claimed in claim 7 further comprising the steps of:
inputting at least one example view of an object of the class other than the subject; and
determining and mapping coordinate values of the control points of the views forming the set of image sequences to control points of the example view to determine, for each parameter value of each working axis, coordinate values of the control points for intermediate views of the object, to generate a respective image sequence for animating the object in the certain movement.

11. A method as claimed in claim 7 wherein the step of inputting sample views includes establishing at least one working axis as one of a longitudinal axis about which the subject may be rotated in a view, an orthogonal axis about which the subject may be tilted in a view, a time axis, or an axis for indicating range of facial expressions of the subject.

12. A method as claimed in claim 7 wherein the step of displaying includes displaying an image from the set of image sequences to provide graphic representation of the subject.

13. Apparatus for computer graphics and animation comprising:
a source for inputting sample views of a subject belonging to a class of similar objects, each sample view providing the subject in a different sample position along a plurality of working axes, each working axis being formed of a plurality of parameter values, each parameter value defining a different position of the subject along the working axes;
a preprocessor coupled to receive from the source the sample views, the preprocessor determining (i) a set of control points of the subject in each sample view, and (ii) plane coordinate values of the control points in each sample view, and for each sample view, the preprocessor associating the coordinate values of the control points with the parameter values of the working axes indicative of the sample position of the subject in that sample view, for different objects of the class, the preprocessor determining different sets of control points;
an image processor coupled to the preprocessor and responsive to the associations between the coordinate values of the control points and the parameter values of the sample positions of the subject, the image processor mapping the coordinate values of the control points for sample positions of the subject to the coordinate values of the control points for desired intermediate positions along the working axes to form intermediate views of the subject, the image processor forming a set of image sequences from both the sample views and formed intermediate views, one image sequence for each working axis, the set of image sequences defining a prototype range for animation of any object in the class of objects in a certain movement; and
a display coupled to the image processor for displaying an image sequence from the set of image sequences to provide graphic animation of the subject in the certain movement.

14. The apparatus as claimed in claim 13 wherein the image processor interpolates the coordinate values of the control points for sample positions of the subject to the coordinate values of the control points for desired intermediate positions.

15. The apparatus as claimed in claim 14 wherein the image processor comprises a Gaussian function to map the control points.

16. The apparatus as claimed in claim 15 wherein the Gaussian function is calculated by a Hyper Basis Function network.

17. The apparatus as claimed in claim 16 wherein the Hyper Basis Function network implements a Radial Basis Function.

18. The apparatus as claimed in claim 13 wherein the image processor comprises a spline function to map the control points.

19. The apparatus as claimed in claim 13 wherein the display further displays an image from the set of image sequences to provide graphic representation of the subject.

20. In a computer system, a graphics and animation method comprising the steps of:
inputting sample views of a subject belonging to a class of similar objects, each sample view providing the subject in a different sample position along a plurality of working axes, each working axis being formed of a plurality of parameter values, each parameter value defining a different position of the subject along the working axes, and a sequence of the sample positions together with intermediate positions animating the subject in a certain movement;
determining a set of control points of the subject in each sample view, including for different objects of the class, determining different sets of control points;
for each sample view (i) determining coordinate values of the control points, and (ii) establishing an association between the coordinate values of the control points and parameter values of the working axes indicative of the sample position of the subject in that sample view;
mapping the coordinate values of the control points for sample positions of the subject to the coordinate values of the control points for desired intermediate positions along the working axes to form intermediate views of the subject;
forming a set of image sequences from both the sample views and formed intermediate views, one image sequence for each working axis, the set of image sequences defining a prototype range for animation of any object in the class of objects; and
displaying an image sequence from the set of image sequences through a display of the computer system to provide graphic animation of the subject in the certain movement.

21. The method as claimed in claim 20 wherein the step of mapping comprises interpolating the coordinate values of the control points for sample positions of the subject to the coordinate values of the control points.

22. The method as claimed in claim 20 wherein the step of mapping comprises executing a Gaussian function.

23. The method as claimed in claim 22 wherein the step of executing a Gaussian function includes executing a Hyper Basis Function.

24. The method as claimed in claim 23 wherein the step of executing a Hyper Basis Function includes executing a Radial Basis Function.

25. The method as claimed in claim 20 wherein the step of mapping comprises executing a spline function.

26. The method as claimed in claim 20 wherein the step of displaying includes displaying an image from the set of image sequences to provide graphic representation of the subject.

27. Apparatus for computer graphics comprising:
a source for inputting sample views of a subject belonging to a class of similar objects, each sample view providing the subject in a different sample position along at least one working axis, each working axis being formed of a plurality of parameter values, each parameter value of a working axis defining a different position of the subject along that working axis;
a preprocessor coupled to receive from the source the sample views, the preprocessor determining (i) a set of control points of the subject in each sample view, and (ii) plane coordinate values of the control points in each sample view, and for each sample view, the preprocessor associating the coordinate values of the control points with the parameter values of each working axis indicative of the sample position of the subject in that sample view, for different objects of the class, the preprocessor determining different sets of control points;
an image processor coupled to the preprocessor and responsive to the associations between the coordinate values of the control points and the parameter values of the sample positions of the subject, the image processor mapping the coordinate values of the control points for sample positions of the subject to control point coordinate values for desired intermediate positions along each working axis to form intermediate views of the subject, the image processor forming a set of images from both the sample views and formed intermediate views, one image subset for each working axis; and
a display coupled to the image processor for displaying an image from the set of images to provide graphic representation of the subject.

28. In a computer system, a graphics method comprising the steps of:
inputting sample views of a subject belonging to a class of similar objects, each sample view providing the subject in a different sample position along a plurality of working axes, each working axis being formed of a plurality of parameter values, each parameter value defining a different position of the subject along the working axes;
determining a set of control points of the subject in each sample view, including for different objects of the class, determining different sets of control points;
for each sample view (i) determining coordinate values of the control points, and (ii) establishing an association between the coordinate values of the control points and parameter values of the working axes indicative of the sample position of the subject in that sample view;
mapping the coordinate values of the control points for sample positions of the subject to the coordinate values of the control points for desired intermediate positions along the working axes to form intermediate views of the subject;
forming a set of images from both the sample views and formed intermediate views, one image subset for each working axis; and
displaying an image from the set of images through a display of the computer system to provide graphic representation of the subject.

* * * * *